US012807245B2

(12) United States Patent
Luetzen et al.

(10) Patent No.: US 12,807,245 B2
(45) Date of Patent: Nov. 24, 2026

(54) AIR INDUCERS FOR LOW PRESSURE GENERATION FOR DOWNFORCE

(71) Applicant: FCA US LLC, Auburn Hills, MI (US)

(72) Inventors: Zachary A Luetzen, West Bloomfield, MI (US); Travis D Bechtel, Goodrich, MI (US); Michael J Wiland, Washington, MI (US); Bryon Wasacz, South Lyon, MI (US)

(73) Assignee: FCA US LLC, Auburn Hills, MI (US)

( * ) Notice: Subject to any disclaimer, the term of this patent is extended or adjusted under 35 U.S.C. 154(b) by 318 days.

(21) Appl. No.: 18/589,697

(22) Filed: Feb. 28, 2024

(65) Prior Publication Data

US 2025/0269914 A1 Aug. 28, 2025

(51) Int. Cl.
*B62D 35/02* (2006.01)

(52) U.S. Cl.
CPC .................................... *B62D 35/02* (2013.01)

(58) Field of Classification Search
CPC ...................................................... B62D 35/02
See application file for complete search history.

(56) References Cited

U.S. PATENT DOCUMENTS

| | | | | |
|---|---|---|---|---|
| 4,611,847 | A * | 9/1986 | Sullivan | B62D 35/001 296/180.2 |
| 8,794,363 | B2 | 8/2014 | Wolf | |
| 8,798,868 | B2 | 8/2014 | Mares | |
| 8,870,275 | B1 * | 10/2014 | Schmidt | F15D 1/008 244/209 |
| 9,849,924 | B2 | 12/2017 | Shami | |
| 9,932,074 | B2 * | 4/2018 | Sarhadiangardabad | B62D 35/02 |
| 9,963,175 | B2 | 5/2018 | Menicovich et al. | |
| 10,293,870 | B2 | 5/2019 | Gaylard et al. | |
| 2019/0176908 | A1 | 6/2019 | Slight | |
| 2023/0339553 | A1 * | 10/2023 | Yoon | B62D 37/02 |

FOREIGN PATENT DOCUMENTS

| | | | | | |
|---|---|---|---|---|---|
| CN | 116252875 | A | * | 6/2023 | B62D 35/008 |
| DE | 102022211917 | A1 | * | 10/2023 | B62D 35/005 |
| EP | 2822787 | B1 | | 1/2015 | |
| GB | 2520888 | B | | 11/2019 | |
| GB | 2606718 | A | * | 11/2022 | B62D 37/02 |

* cited by examiner

*Primary Examiner* — Lori Lyjak
(74) *Attorney, Agent, or Firm* — Jeremy J. Klobucar

(57) ABSTRACT

A vehicle air flow inducer system for providing downforce, thrust and drag reduction in a vehicle has a source for generating a pressurized air flow. An air receiver receives the pressurized air flow. The air receiver includes a plurality of air inducers. Each air inducer directs a portion of the air flow. A chamber is coupled individually with one of the plurality of air inducers such that the plurality of air inducers create a low pressure in the chamber during flow of the pressurized air. The low pressure chamber is coupled with an underside of the vehicle such that a presence of low pressure creates a downward force on the vehicle. An exhaust directs air flow exiting the system for providing directional thrust or drag reduction.

11 Claims, 5 Drawing Sheets

AIR INDUCERS FOR LOW PRESSURE GENERATION FOR DOWNFORCE

FIELD

The present disclosure relates to the vehicles and, more particularly, to an air flow inducer system to provide downforce, thrust and drag reduction.

BACKGROUND

This section provides background information related to the present disclosure which is not necessarily prior art.

Use of negative/low pressure areas below high performance vehicles will increase downward force and corresponding tire traction to improve launch and cornering performance. Performance vehicles include powered downforce systems as a traction aids that place the driving air flow device in the path of the air pulled from the road surface. This source of air also suspends debris in a high velocity air stream that can rapidly degrade the performance of the driving vehicle. Current solutions to this problem require very frequent servicing/replacement of the wearing components or a filter strategy that requires frequent cleaning or replacement of the filter media.

Current solutions for thermal management on high performance electric vehicles limits the duty cycle and duration at high demand. This limits the usage of these vehicle for track use. Currently solutions for drag reduction to enhance vehicle top speed may employ a powered air flow system to reduce drag behind the vehicle by forming a moving air pattern complimentary to the vehicle's physical shape and resultant wake at high speeds. Current solutions for acceleration aids, like directed thrust devices, are limited in the duration of the thrust provided and in the negative mass and packaging of effects of stored or generated compressed gas source. Downward force has been achieved through splitters, spoilers, wings, and other aero elements. These require air flow over surfaces that limit the effectiveness at low speed and affect high speed drag. Active aero elements have been used to adjust the effectiveness but do not provide any downward force from a standstill.

Powered down force cars using low-pressure (suction plenums) areas and others with powered air flow (pushing or drawing air over wing like elements) have been limited in mass production and are for track use only. They have achieved low-pressure by using fans and compressors inline of the air flow. They require substantial filtering and thus service to protect the driving airflow device.

Current electric vehicles use typical thermal management practices such as heat exchangers and electric fans to increase air flow primarily at low speeds. Thrust devices have generally not been used on production and/or road legal vehicles. Some activity has been noted among hypercar brands for increasing acceleration and lateral control concepts. The devices are fed by compressed air tanks that can be prefilled off track and/or replenished while driving.

SUMMARY

This section provides a general summary of the disclosure, and is not a comprehensive disclosure of its full scope or all of its features.

Air flow inducing devices are commonly used in industrial applications for cooling, conveyance, inflation and air circulation for smoke and fumes. A typical use case is in an open environment with no requirement to seal off a low-pressure area. According to the present disclosure, the compressor is moved out of the vacuum air flow path. This enables a smooth flow path that can be adjusted rapidly by the motor that drives the compressor. Additionally, it enables flexible packaging. The present disclosure enables the air flow from the inducer to be used to pass the air flow through heat exchangers, motors, brakes and other high temperature areas. Also, the air flow may be utilized over external elements to increase downward force or reduce drag. The air flow can be directed to increase downward force or lateral thrust. Additionally, the present disclosure removes sensitive compressor wheels and fan blades from the high flow area required for active down force cars by utilizing air inducers.

In accordance with the first aspect of the disclosure, a vehicle air flow inducer system to provide thrust and drag reduction comprises a source for generating a pressurized air flow. An air receiver receives the pressurized air flow. The air receiver includes a plurality of air inducers, each air inducer directing a portion of the air flow. A chamber is coupled with the plurality of air inducers such that the plurality of air inducers creates a low pressure in the chamber during flow of the pressurized air. The low pressure chamber is coupled with an underside of the vehicle such that the presence of the low pressure creates a downward force on the vehicle. An exhaust directs air flow exiting the system to provide directional thrust or drag reduction. The source for generating pressurized air flow is a compressor, storage tank, accumulator or the like. The chamber is defined by a closed configuration skirt extending from the vehicle underside towards the ground. A plurality of purge halves valves are coupled with the plurality of air inducers to restrict flow through the air inducers. A singular or plurality of filter screens are positioned between the plurality of air inducers and the chamber for filtering air flow into the plurality of air inducers. At least one air bank includes the plurality of air inducers. Each air bank is split into an upper and lower part. The lower part contains the throat that feeds the chamber air into the air inducer and the upper part is the outlet that directs the air flow.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
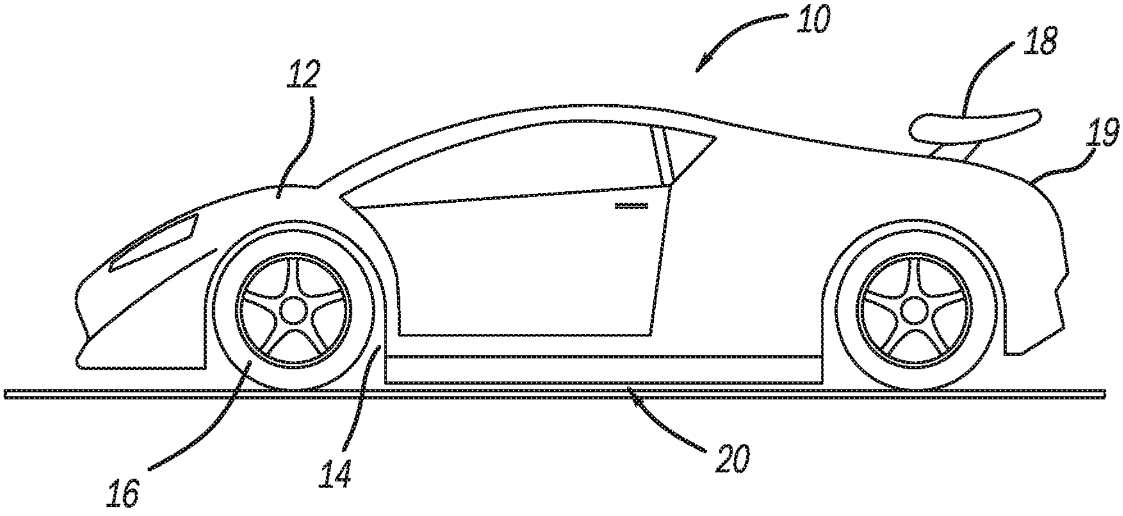
FIG. 1 illustrates a vehicle in accordance with the disclosure.

Example embodiments will now be described more fully with reference to the accompanying drawings.

Turning to the figures, a vehicle is illustrated and designated with the reference numeral 10. The vehicle 10 includes a body 12 with an underside 14 and wheels 16. The body includes a spoiler 18 positioned at the rear of the vehicle body. A skirt 20 extends from the underside of the vehicle 14.

The skirt 20 extends downward from the underside 14 of the vehicle 10 towards the ground. The skirt 20 maintains a gap between the low pressure region under the vehicle 10 and the road surface. By vacuuming air from the region and restricting the flow of back air, the control of the air gap creates a zone of low pressure that pushes the car towards the ground to improve tire adhesion. The skirt 20 has a closed configuration shape, such as a rectangle, as illustrated in schematic form in FIG. 2.

Figure 2:
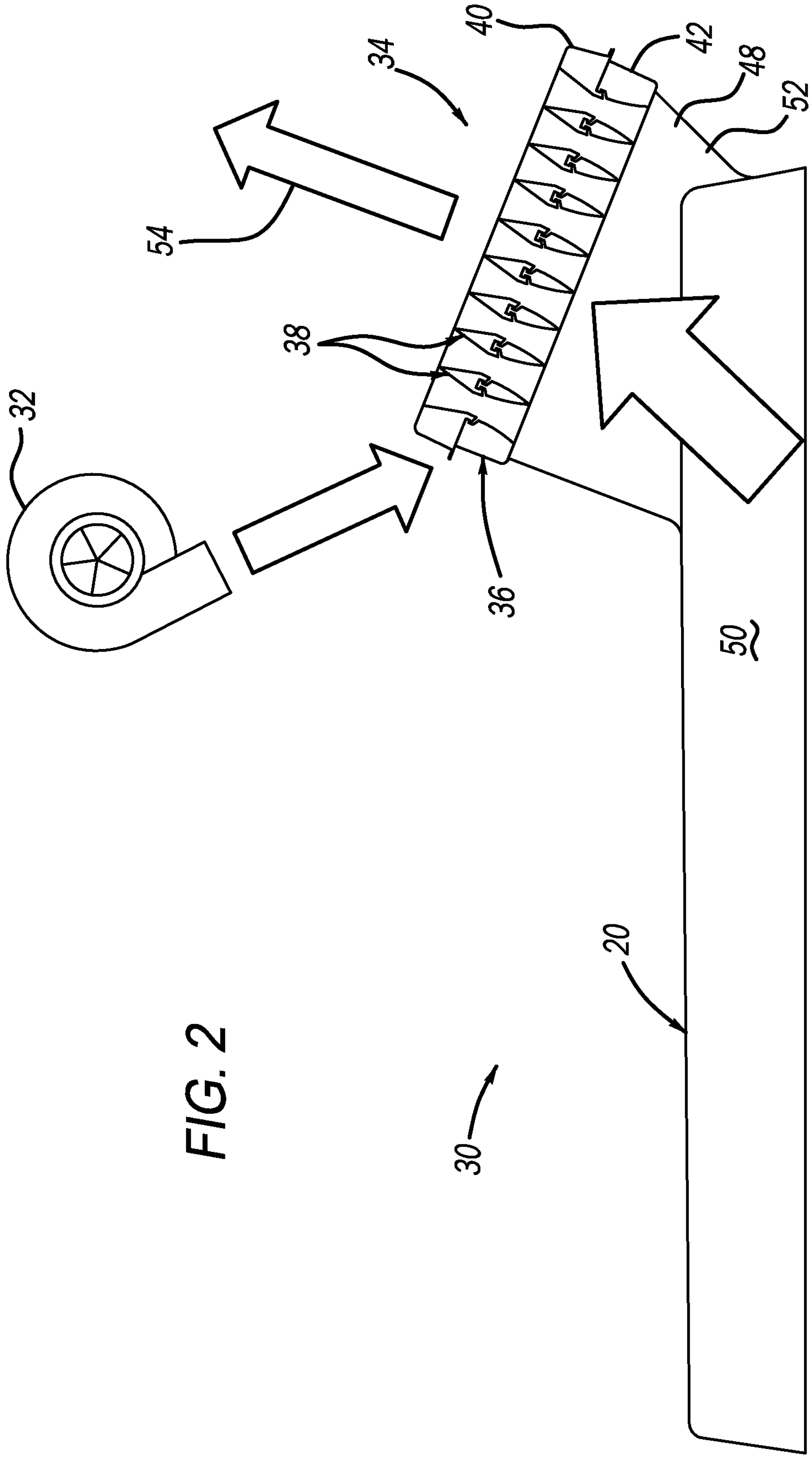
FIG. 2 illustrates a schematic view of an air flow inducer system.

The air inducer system 30 is illustrated in FIG. 2. The system 30 includes a compressor 32 mounted in the vehicle 10. The compressor 10 includes an inlet and an outlet directing a high pressure air flow towards an air inducer 34. The compressor 32 could be replaced by an air storage container, accumulator or the like that generates the high pressure.

The air inducer 34 includes a bank 36 of air flow inducers 38 organized in an array. Each individual bank 36 is fed from a separate high pressure source such as a compressor 30. A flow of air is also pulled from the chamber 50 through the banks 36 of air inducers 38. Thus, air from the high pressure source 30 and the chamber 50 converge into an outlet air flow 52. Each bank 36 is split into an upper 40 and lower 42 part forming a box 46. The lower half 42 contains a throat 48 that feeds the chamber 50 air into the inducer 34. The upper half 40 is the outlet end that includes exhaust features 54 to direct the combined flow to an expanded common area. This expanded common area can entrain flow from an outside source and/or be optimized to improve the induced flow of adjacent inducers. Upper 40 and lower 42 halves would be connected to direct high pressure air flow 30 as a manifold that feeds each inducer. The resultant outlet flow can be directed to multiple purposes.

Each air inducer 38 includes an inlet 56 as well as an outlet 60. The inlet 56 includes a tube portion 58. The outlet 60 includes a conical portion 62 positioned adjacent the end of the tube portion 64. Thus, as the high pressure air flow is directed into the bottom half 42, it is moved towards the outlet 60. The outlet 60, with its conical portion 62 surrounding the end 64 of the inlet tube 64, via a gap, creates a vacuum or negative pressure in the chamber 50 created by the skirt 20. Thus, this creates the low pressure air underneath the vehicle. A screens or filters 72 are positioned at the junction of the inlet and the skirt 20 defining the chamber 50. The filter 52 prohibits debris and the like from entering into the air inducers 38.

The outlet 60 extends into the upper half 40. The upper half 40 has exhaust 54 that may pass air into a heat exchanger element, such as a vehicle brake, an electric motor, a suspension element or the like. Thus, the air drawn into the banks 36 is used to cool these various heated components.

Additionally, the exhaust exits the air flow through the vehicle. The exhaust could be directed towards a spoiler 18, a body panel 19, scoop 21 or the like at the rear of the vehicle 10. As the air flow exits the vehicle 10, the force of the drag is reduced due to the air directed out of the body.

Figure 3:
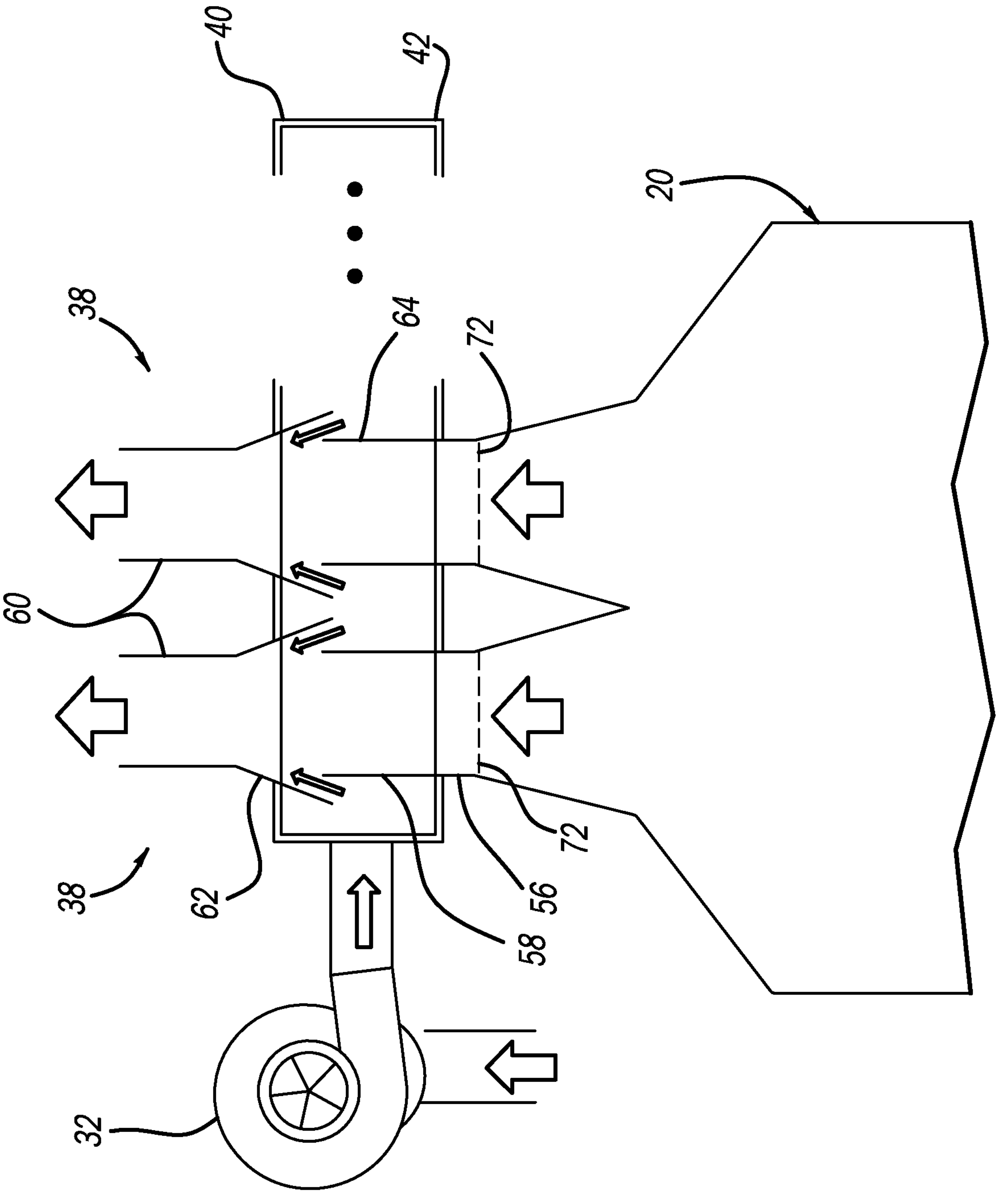
FIG. 3 is a schematic view of an air inducer in accordance with the disclosure.
Figure 4:
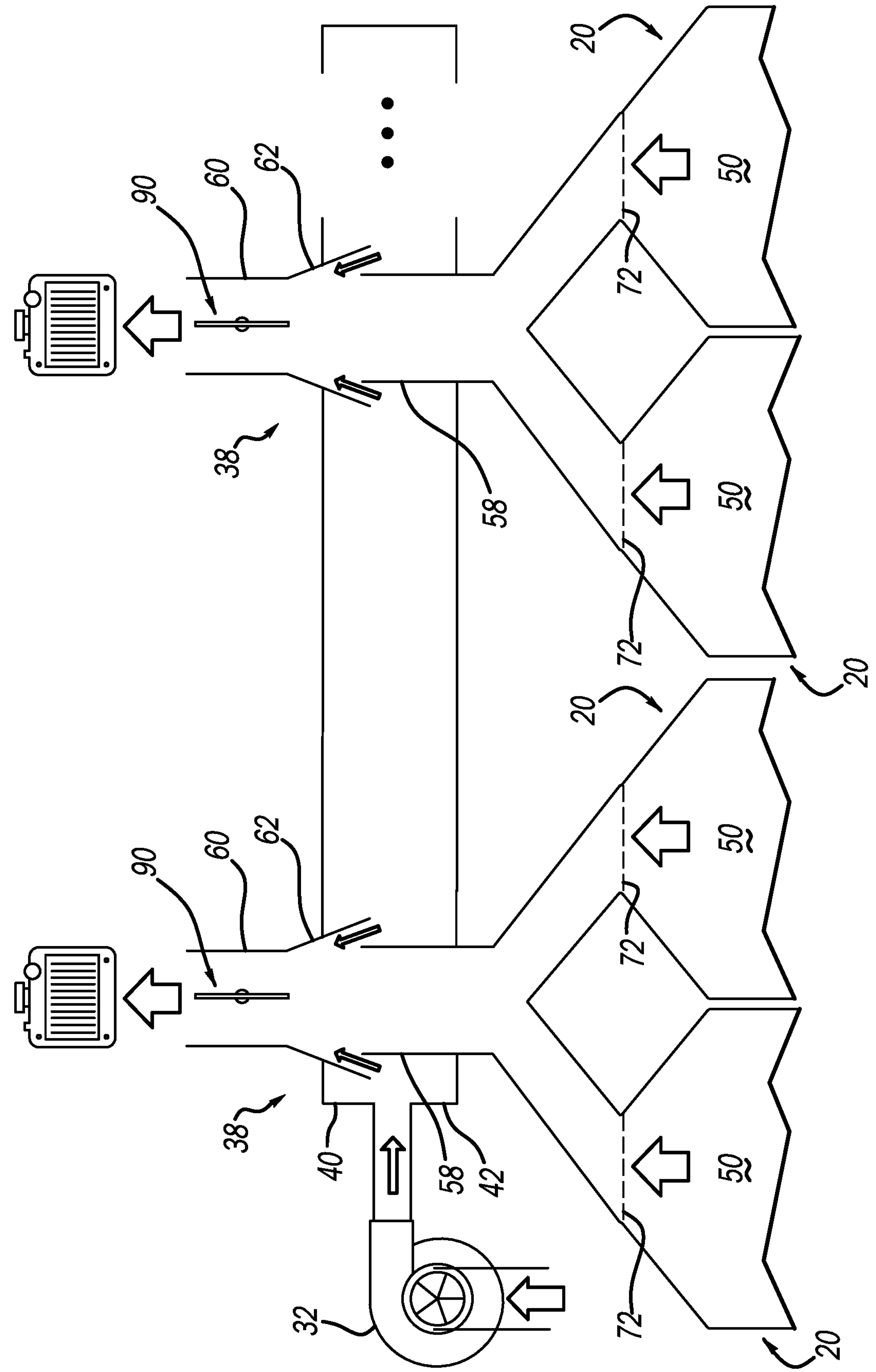
FIG. 4 is a schematic view like FIG. 3 with a check valve.
Figure 5:
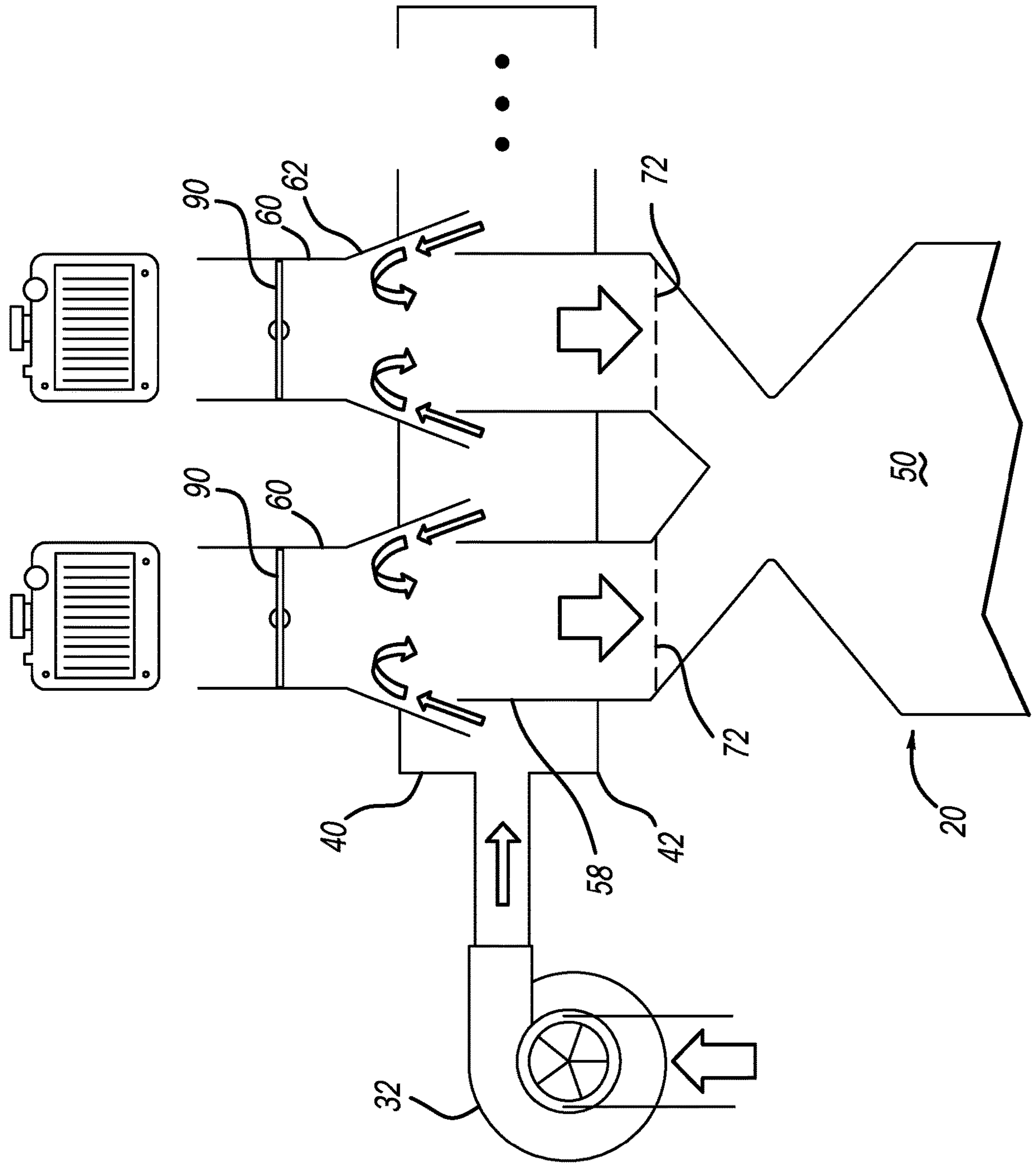
FIG. 5 is a schematic view like FIG. 4 in a second position.

FIGS. 3 and 4 illustrate a purge valve 90 positioned in each of the outlet tubes 42 of the plurality of air inducer 34. Only one purge valve 90 is shown in FIG. 3 and it is illustrated in an opened position and in a closed position in FIG. 4. Here, the valve 90 is closed so that a back flow is created, as illustrated in FIG. 4, from the high pressure air that enters into the inducers from the compressor. Thus, the high pressure air is forced into the low pressure chamber 50 through the screens or filters 52. As it is forced through the screens or filters 52, the debris or the like is blown off or discharged from the screens or filters and falls under the vehicle. Thus, the debris or the like is eliminated from the filter or the screen in an efficient manner.

The air flow inducer system 30 creates a combination of air sources that have different states of motion, pressure and temperature. This creates opportunities to optimize the performance of the device it is applied on. One such device could be a high performance vehicle application where a low pressure area creates a downward force to enhance tractive force to the ground. Such a vehicle would likely have to create this flow from an onboard motor/pump that would require cooling at high load conditions. The vehicle may have an internal combustion engine on an electric motor to move the vehicle at the ground plane that would require powerful heat rejection air flow due to enhanced traction provided by the added down force generated. If the vehicle is battery powered, the high charge and discharge rates needed to power the compressor and ground drive motors would require a large amount of air flow for heat rejection to maintain the performance and durability of the battery and power management system and could include cooling of the conductor connecting these devices.

In a high performance vehicle application, the air flow created by the inducer system can also be exhausted from the vehicle in a manner that creates desirable thrust and/or drag reduction after being routed through heat exchangers or bypass the heat exchangers when cooling is not needed. The thrust can be directed in a manner that presses the chassis to the ground to increase tractive force or in a manner that pushes the vehicle forward or laterally to improve acceleration, speed or handling response. Additionally, the exit of the air flow can be routed in a manner that reduces the aerodynamic drag of the vehicle for the purpose of increasing top speed, improving efficiency at lower speeds or achieving a specific styling body length/shape without an aerodynamic speed or efficiency degradation. The air flow inducer system is uniquely capable of creating large pressure drops or positive head pressure of an air flow for multiple purposes onboard a high performance electric vehicle.

The concept can take in large amounts of air from areas of the vehicle that may contain amounts of dirt/dust that would degrade the performance of other systems that must pass the material through an impeller directly or separate the material via a separator filter. These filters and separators add mass requiring packaging space and generally degrade the system performance overall and over time between a required cleaning maintenance. Designers can use the pressure drop to create a suction force to improve handling to overcome the added EV mass and/or pull air through heat exchangers. The high pressure out flow can be used to push air through heat exchangers and/or direct the air flow in a manner that aids handling thrust or reduces drag around behind the vehicle to increase top speed and increase driving range.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle air flow inducer system for providing thrust and drag reduction in a vehicle comprising:

a source for generating a pressurized air flow;

an air receiver receiving the pressurized air flow, the air receiver including a plurality of air inducers, each air inducer directing a portion of the air flow;

a chamber coupled with the plurality of air inducers such that the plurality of air inducers creates a low pressure in the chamber during flow of the pressurized air, the low pressure chamber coupled with an underside of the vehicle such that a presence of low pressure creates a downward force on the vehicle; and an exhaust for directing air flow exiting the system for providing directional thrust or drag reduction.

2. The vehicle air flow inducer system of claim 1, wherein the source for generating pressurized air flow is a compressor, storage tank, or accumulator.

3. The vehicle air flow inducer system of claim 1, wherein the chamber is defined by a closed configuration skirt extending from the vehicle underside toward the ground.

4. The vehicle air flow inducer system of claim 1, further including a plurality of purge valves coupled with the plurality of air inducers for restricting flow through the air inducer.

5. The vehicle air flow inducer system of claim 1, further including a plurality of filter screens between the plurality of air inducers and the chamber for filtering air flow into the plurality of air inducers.

6. A vehicle having a body with an underside comprising:

a source for generating a pressurized air flow;

an air receiver receiving the pressurized air flow, the air receiver including a plurality of air inducers, each air inducer directing a portion of the air flow;

a chamber coupled with the plurality of air inducers such that the plurality of air inducers creates a low pressure in the chamber during flow of the pressurized air, the low pressure chamber coupled with an underside of the vehicle such that a presence of low pressure creates a downward force on the vehicle; and an exhaust for directing air flow exiting the system for providing directional thrust or drag reduction.

7. The vehicle having a body with an underside of claim 6, wherein the source for generating pressurized air flow is a compressor, storage tank, or accumulator.

8. The vehicle having a body with an underside of claim 6, wherein the chamber is defined by a closed configuration skirt extending from the vehicle underside toward the ground.

9. The vehicle having a body with an underside of claim 6, further including a plurality of purge valves coupled with the plurality of air inducers for restricting flow through the air inducer.

10. The vehicle having a body with an underside of claim 6, further including a plurality of filter screens between the plurality of air inducers and the chamber for filtering air flow into the plurality of air inducers.

11. The vehicle air flow inducer system of claim 1, wherein the air receiver is a bank having an upper and lower half.

* * * * *